(12) United States Patent
Kilmer

(10) Patent No.: US 6,600,628 B2
(45) Date of Patent: Jul. 29, 2003

(54) AIR CENTERING DISK CHUCK

(75) Inventor: Dan Kilmer, Seiad Valley, CA (US)

(73) Assignee: KLA-Tencor Corporation, San Jose, CA (US)

(*) Notice: Subject to any disclaimer, the term of this patent is extended or adjusted under 35 U.S.C. 154(b) by 101 days.

(21) Appl. No.: 09/833,241

(22) Filed: Apr. 10, 2001

(65) Prior Publication Data

US 2002/0145823 A1 Oct. 10, 2002

(51) Int. Cl.[7] ............ G11B 17/028; G11B 25/04
(52) U.S. Cl. .................... 360/99.12; 369/270
(58) Field of Search ............ 360/99.12, 98.08; 137/14, 15.01, 38, 100, 625.61, 625.62, 625.63, 202, 629; 279/2.06; 369/270, 271

(56) References Cited

U.S. PATENT DOCUMENTS

| | | |
|---|---|---|
| 2,919,960 A | 1/1960 | Whitney |
| 3,385,641 A | 5/1968 | Foglia |
| 3,622,213 A | 11/1971 | Onsrud |
| 3,875,589 A | 4/1975 | Applequist et al. |
| 4,095,855 A | 6/1978 | Fox |
| 4,262,697 A * | 4/1981 | Davis ............ 137/625.5 |
| 4,493,072 A | 1/1985 | Shibata |
| 4,521,819 A | 6/1985 | Elsing et al. |
| 4,671,676 A | 6/1987 | Chen et al. |
| 4,786,997 A | 11/1988 | Funabashi et al. |
| 4,918,545 A | 4/1990 | Scheffel |
| 4,980,783 A | 12/1990 | Moir et al. |
| 5,025,340 A | 6/1991 | Peters |
| 5,048,005 A | 9/1991 | Ekhoff |
| 5,056,082 A | 10/1991 | Ekhoff |
| 5,072,781 A * | 12/1991 | Goodman ............ 165/300 |
| 5,113,104 A | 5/1992 | Blaettner et al. |
| 5,331,488 A | 7/1994 | McAllister et al. |
| 5,333,140 A | 7/1994 | Moraru et al. |
| 5,447,376 A | 9/1995 | Cunningham |
| 5,504,638 A | 4/1996 | Kinoshita et al. |
| 5,559,651 A | 9/1996 | Grantz et al. |
| 5,617,267 A | 4/1997 | Kawagoe et al. |
| 5,644,564 A | 7/1997 | Peters |
| 5,692,840 A | 12/1997 | Rhoton et al. |
| 5,744,882 A | 4/1998 | Teshima et al. |
| 5,783,882 A | 7/1998 | Brezoczky et al. |
| 5,789,839 A | 8/1998 | Langenbeck |
| 5,801,464 A | 9/1998 | Brezoczky |
| 5,825,180 A | 10/1998 | Guzik |
| 5,957,588 A | 9/1999 | Wahl |

FOREIGN PATENT DOCUMENTS

| | | | |
|---|---|---|---|
| EP | 0212277 | 7/1985 | |
| JP | 58-215703 | 12/1983 | |
| JP | 62-212957 | 9/1987 | |
| JP | 62-212958 | 9/1987 | |
| JP | 63-103487 | 5/1988 | |
| JP | 63138557 A * | 6/1988 | ......... G11B/17/028 |
| JP | 01149255 A * | 6/1989 | ......... G11B/17/028 |
| JP | 4-353663 | 12/1992 | |
| JP | 404364285 | 12/1992 | |
| JP | 09007262 A * | 1/1997 | ......... G11B/17/022 |
| JP | 09190650 A * | 7/1997 | ............ G11B/7/26 |
| JP | 11016236 A * | 1/1999 | ......... G11B/17/028 |
| JP | 2000011505 A * | 1/2000 | ......... G11B/17/028 |

OTHER PUBLICATIONS

"Self Centering Non–Contact Pick–Up," Jan. 1980, IBM Technical Disclosure Bulletin, vol. 22, Iss. No. 8A, pp. 3370–3371.*

"Holographic Disk Clamping Device," May 1989, IBM Technical Disclosure Bulletin, vol. 31, Iss. No. 12, pp. 300–301.*

* cited by examiner

Primary Examiner—William Klimowicz
(74) Attorney, Agent, or Firm—Irell & Manella LLP

(57) ABSTRACT

A chuck that can center a disk. The chuck may be part of a spindle motor that is integrated into a servo writer. The chuck includes a plurality of cartridges that are attached to a post. The cartridges are coupled to a source of air. Each cartridge may include a biasing element that can move within a variable orifice and engage an inner edge of the disk. The biasing elements move until each cartridge exerts an equal force onto the disk. The equal forces will center the disk onto the spindle motor.

29 Claims, 3 Drawing Sheets

AIR CENTERING DISK CHUCK

BACKGROUND OF THE INVENTION

1. Field of the Invention

The present invention relates to an air chuck that can center a disk.

2. Background Information

Hard disk drives contain a plurality of recording heads that are located adjacent to one or more magnetic disks. The recording heads can write and read information on the magnetic disks by magnetizing or sensing the magnetic field of the disks, respectively. The storage of information is typically segmented into a plurality of circumferential tracks that extend across the surfaces of the disks. Each track typically contains a servo field. The servo field includes servo bits that are used by the drive to center a head onto the centerline of a track.

Disks are typically tested for manufacturing imperfections before being assembled into a drive. The disks are typically tested in an apparatus commonly referred to as a certifier. The disks are manually loaded onto a spindle motor of the certifier. The certifier has heads which are coupled to circuits that can write and then read signals from the disks. The signal read back from the disk is analyzed to identify any disk imperfections. Additionally, the mechanical surface of the disk can be inspected to identify asperities, etc.

After certification, servo information is then written onto the disk. The servo information is typically written by an apparatus commonly referred to as a servo writer. Like the certifier, a servo writer will have a spindle motor, heads and electronic circuitry.

It is desirable to write the servo information along tracks that are concentric with the center opening of the disk. Concentric tracks decrease the seek and centering time required to move the heads within a drive. Spindle motors of the prior art typically have mechanical, vacuum, or air driven clamps that clamp the disk(s) onto a centering post. Even with tight manufacturing tolerance requirements there is always a small space between the post and the disk. This space may allow the disk to be off-center from the centering post. The space will create non-concentric servotracks. Additionally, centrifugal forces caused by rotating off-center disks can produce structural vibrations which result in differential head to disk motions. The differential head to disk motions will create inaccuracies in the resultant servo information. It is therefore desirable to provide a chuck that can accurately center a disk onto a spindle motor.

BRIEF SUMMARY OF THE INVENTION

One embodiment of the present invention is a chuck which has a plurality of cartridges that can exert essentially equal forces onto an inner edge of a disk. The equal forces center the disk onto a spindle motor. The spindle motor may be part of a servo writer for writing servo information onto the disk. Each cartridge may include a biasing element that can move within a variable orifice and engage the inner edge of the disk.

DETAILED DESCRIPTION

In general the present invention includes a chuck that can center a disk. The chuck may be part of a spindle motor that is integrated into a servo writer. The chuck includes a plurality of cartridges that are attached to a post. The cartridges are coupled to a source of air. Each cartridge may include a biasing element that can move within a variable orifice and engage an inner edge of the disk. The biasing elements move until each cartridge exerts an equal force onto the disk. The equal forces will center the disk onto the spindle motor.

Figure 1:
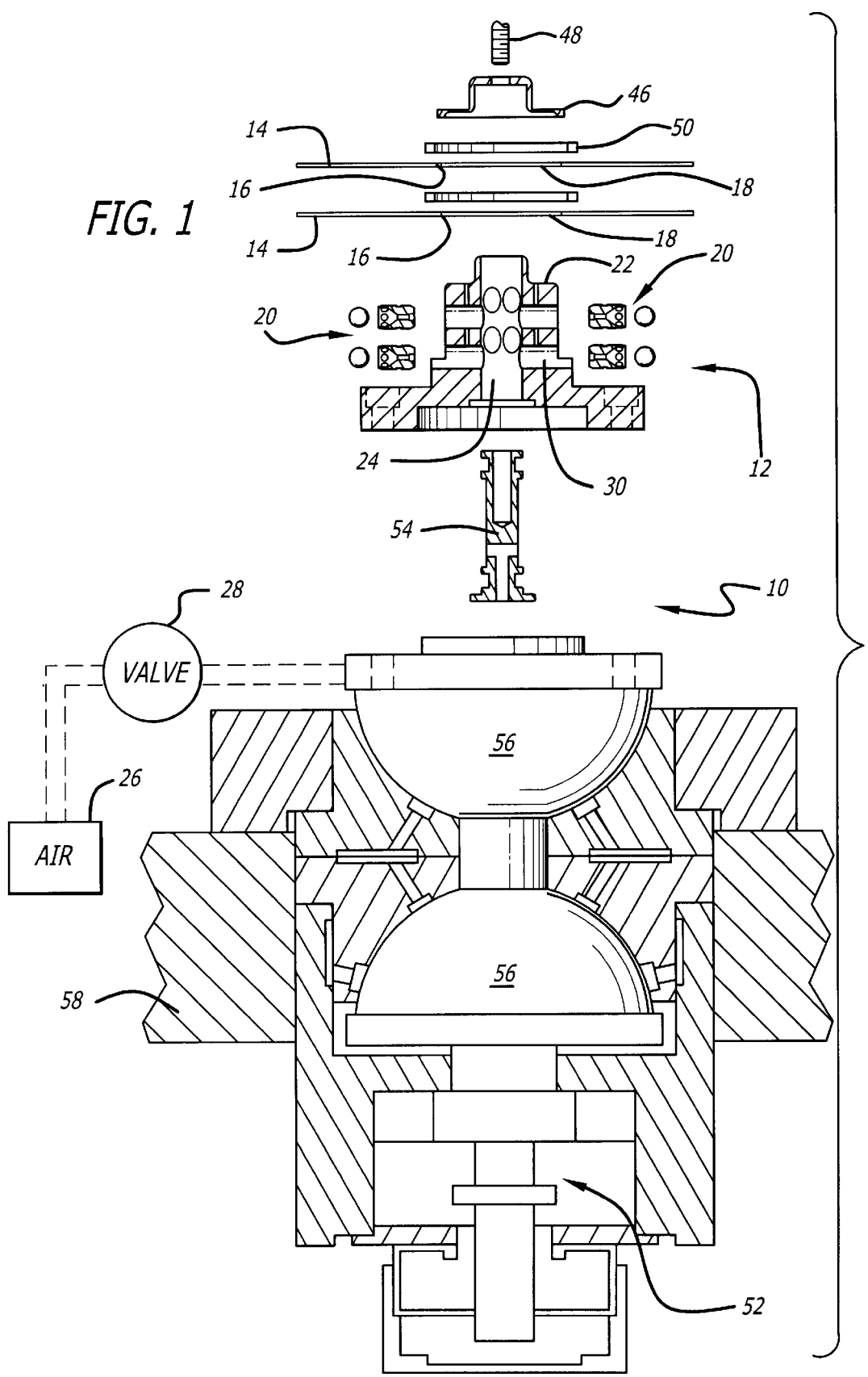
FIG. 1 is a cross-sectional view of an embodiment of a spindle motor of the present invention.

Referring to the drawings more particularly by reference numbers, FIG. 1 shows an embodiment of a spindle motor 10 of the present invention. The spindle motor 10 may include a chuck 12 that can secure one or more disks 14. The disks 14 may be magnetic mediums that are typically assembled into a hard disk drive. Each disk 14 typically includes an inner edge 16 that extends around a center opening 18.

The chuck 12 includes a plurality of cartridges 20 that are attached to a post 22. The post 22 has a center channel 24 that is in fluid communication with a source of air 26. The source of air 26 may provide a positive air flow to the channel 24. The flow of air may be controlled by a valve 28. The center channel 24 is in fluid communication with a plurality of radial channels 30. Although air is described, it is to be understood that other fluids such as a gas can be provided to the channel 24.

Figure 2:
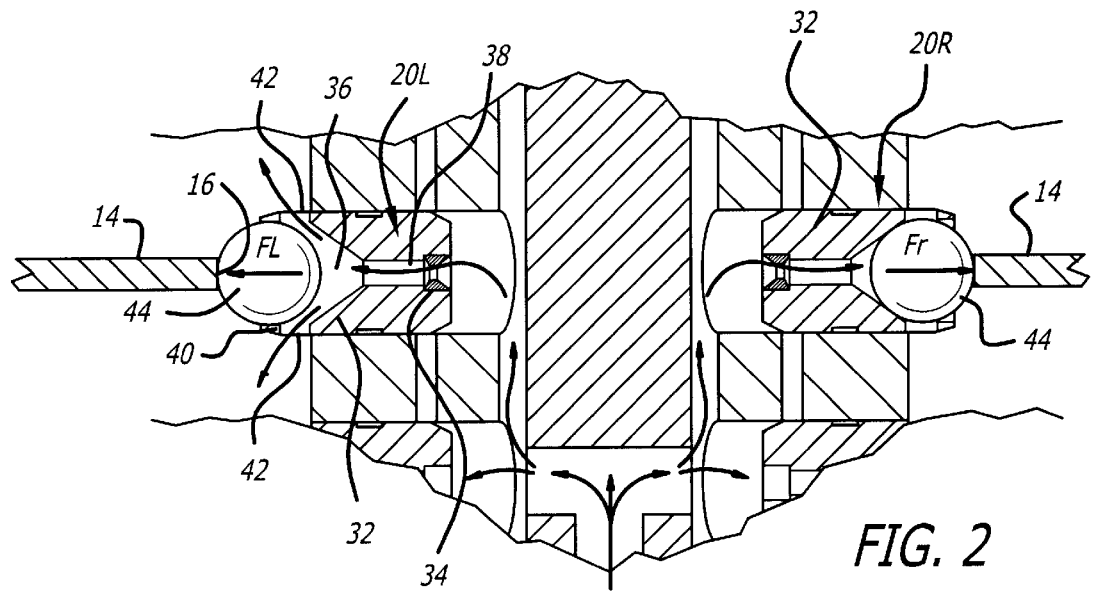
FIG. 2 is an enlarged sectional view showing a disk initially placed onto the spindle motor.

Referring to FIG. 2, each cartridge 20 includes an insert 32 that has a fixed orifice 34. The fixed orifice 34 is coupled to a variable orifice 36 by a channel 38. The variable orifice 36 is in fluid communication with the source of air 26. Each insert 32 also includes an opening 40 and a plurality of ports 42. The ports 42 are in fluid communication with the variable orifices 36.

Each cartridge 20 includes a biasing element 44 such as a ball that can move within the variable orifice 36 and engage the inner edge 16 of the disk 14 through the opening 40. The position of the ball 44 defines the flowrate of air from the variable orifice 36 through the ports 42. The ends of the inserts 32 may be crimped after the balls 44 are inserted into the variable orifices 36. The crimped ends prevent the balls 44 from falling out of the cartridges 20. The ports 42 are preferably equally spaced about the insert 32 so that there is approximately the same flow rate through each port 42.

The diameter of the fixed orifices 34 are each the same. Additionally, the diameter of each ball 44 is the same to create a symmetric chuck. The air pressure between the fixed 34 and variable 36 orifices create outward forces that bias the balls into the disk 14.

As shown in FIG. 2, a disk 14 may be initially offset from the chuck 12. The balls 44 engage the inner edge 16 of the disk 14 through the openings 40. When the disk 14 is offset, the inner edge 16 of the disk 14 pushes the ball 44 in the right cartridge 20R farther into the variable orifice 36 than the ball 44 in the left cartridge 20L. The right cartridge 20R will thus have a lower flowrate and higher back pressure than the left cartridge 20L. The higher back pressure will cause the right cartridge 20R to exert a force Fr that is greater than the force $F_L$ exerted by the left cartridge 20L.

The unequal forces will cause the ball 42 of the right cartridge 20R to push the disk 14 to the right.

Figure 3:
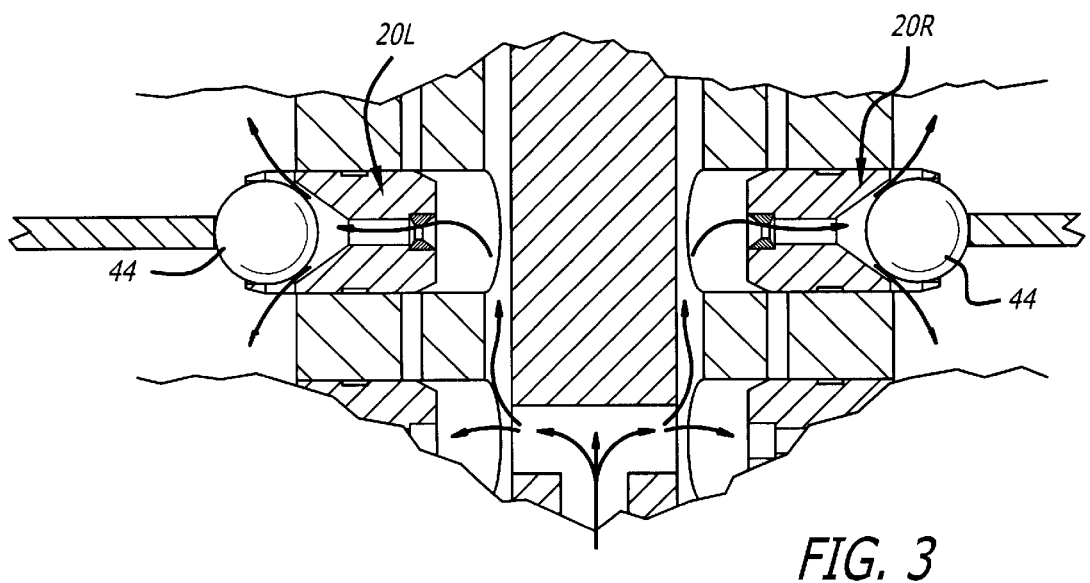
FIG. 3 is an enlarged sectional view showing the disk centered onto the spindle motor.

As shown in FIG. 3, the balls 44 and disk 14 move until the back pressures and resultant forces of each cartridge 20 are essentially equal. It is desirable to have at least three cartridges equally spaced about the post 22 (e.g. 120° apart) to insure that the disk 14 is concentrically centered onto the spindle motor 12.

Referring to FIG. 1, the chuck 12 may include a clamp 46 and screw 48 that clamps the centered disks 14 onto the post 22. The chuck 12 may also include a plurality of spacers 50 that separate the disks 14.

The spindle motor 52 may include a motor 52 that is coupled to the post 22 by a manifold 54 and air bearings 56. The motor 52 can rotate the post 22 and spin the disks 14. The spindle motor 10 may be attached to a table 58.

Figure 4:
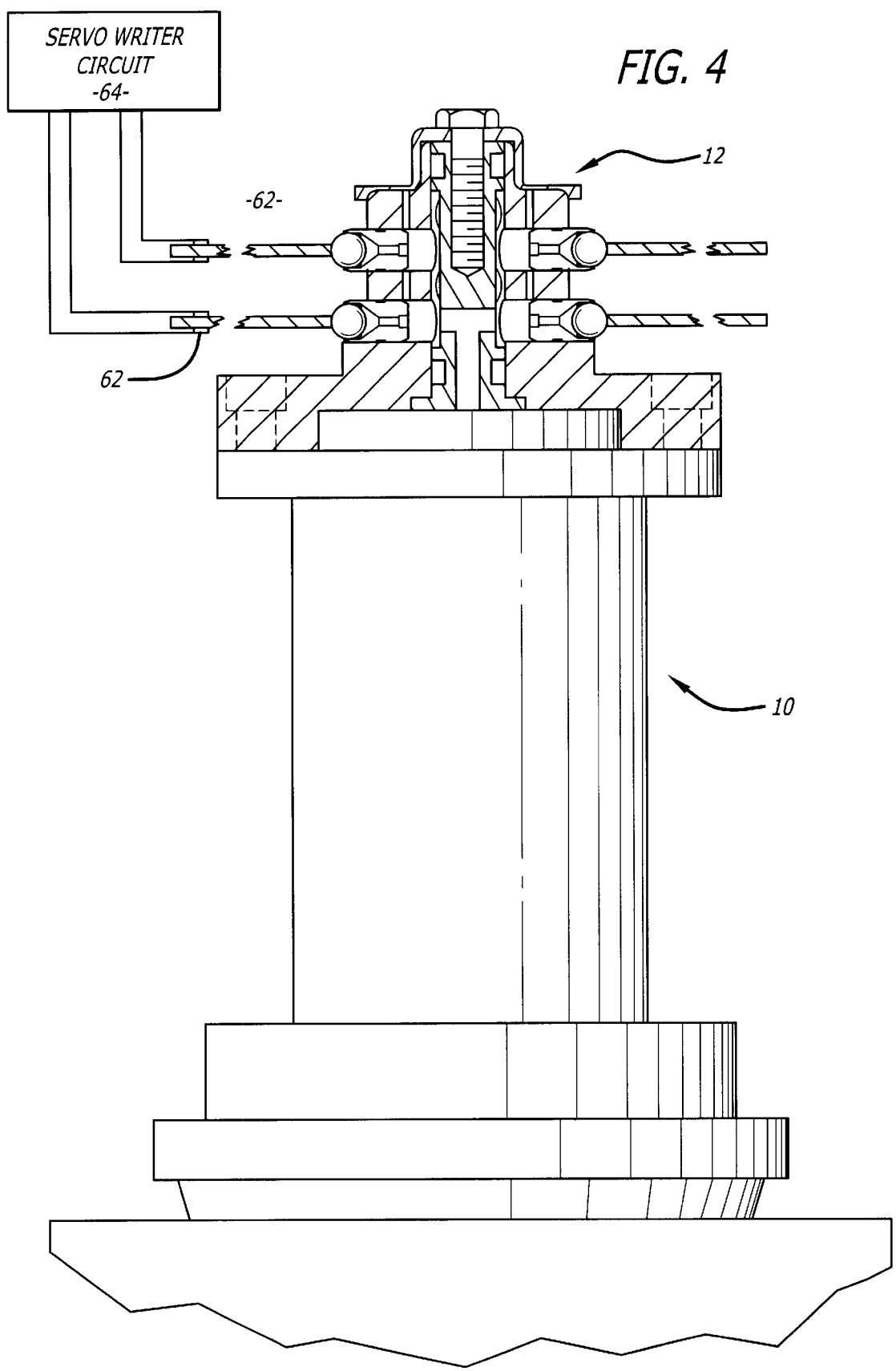
FIG. 4 is a side view showing a spindle motor integrated into a servo writer.

As shown in FIG. 4, the spindle motor 10 and chuck 12 may be integrated into a servo writer 60. The servo writer 60 can write servo information onto the disks 14. The servo writer 60 may include a plurality of magnetic recording heads 62 that can be placed adjacent to the disk surfaces. The heads 62 are coupled to a servo writer circuit(s) 64. The circuit 64 and heads 62 can write servo information in accordance with a servo writing routine.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although incorporation of the spindle motor 10 into a servo writer has been shown and described, it is to be understood that the motor 10 and chuck 12 can be utilized in another apparatus. For example, the motor 10 and chuck 12 can be incorporated into a disk certifier that measures electrical and/or mechanical characteristics of the disks 14.

What is claimed is:

1. A chuck for centering a disk that has an inner edge, the chuck being coupled to a source of fluid, comprising:
    a post; and,
    a plurality of cartridges attached to said post, each cartridge having a biasing element that can move within a variable orifice and engage the inner edge of the disk, each variable orifice being in fluid communication with the source of fluid through a fixed orifice.

2. The chuck of claim 1, wherein said biasing element is a ball.

3. The chuck of claim 1, wherein said cartridge includes an insert with an opening and said biasing element extends through said opening.

4. The chuck of claim 3, wherein said insert includes a plurality of ports in fluid communication with said variable orifice.

5. A chuck for centering a disk that has an inner edge, the chuck being coupled to a source of fluid, comprising:
    a post; and,
    a plurality of cartridges attached to said post and coupled to the source of fluid, each cartridge exerts an essentially equal force on the inner edge of the disk when the disk is centered on said post, each cartridge contains a biasing element that moves independently of the biasing elements in the other cartridges.

6. The chuck of claim 5, said biasing elements each move within a variable orifice and engage the inner edge of the disk, each variable orifice being coupled to the source of air through a fixed orifice.

7. The chuck of claim 6, wherein said biasing element is a ball.

8. The chuck of claim 6, wherein said cartridge includes an insert with an opening and said biasing element extends through said opening.

9. The chuck of claim 8, wherein said insert includes a plurality of ports in fluid communication with said variable orifice.

10. A spindle motor that is coupled to a source of fluid and can support a disk with an inner edge, comprising:
    a motor;
    a post coupled to said motor; and,
    a plurality of cartridges attached to said post, each cartridge having a biasing element that can move within a variable orifice and engage the inner edge of the disk, each variable orifice being in fluid communication with the source of fluid.

11. The spindle motor of claim 10, wherein said biasing element is a ball.

12. The spindle motor of claim 10, wherein said cartridge includes an insert with an opening and said biasing element extends through said opening.

13. The spindle motor of claim 12, wherein said insert includes a plurality of ports in fluid communication with said variable orifice.

14. A spindle motor that is coupled to a source of fluid and can support a disk with an inner edge, comprising:
    a motor;
    a post coupled to said motor; and,
    a plurality of cartridges attached to said post and coupled to the source of fluid, each cartridge exerts an essentially equal force on the inner edge of the disk when the disk is centered on said post, each cartridge contains a biasing element that moves independently of the biasing elements in the other cartridges.

15. The spindle motor of claim 14, wherein said biasing elements each move within a variable orifice and engage the inner edge of the disk, each variable orifice being coupled to the source of air through a fixed orifice.

16. The spindle motor of claim 15, wherein said biasing element is a ball.

17. The spindle motor of claim 15, wherein said cartridge includes an insert with an opening and said biasing element extends through said opening.

18. The spindle motor of claim 17, wherein said insert includes a plurality of ports in fluid communication with said variable orifice.

19. A servo writer that is coupled to a source of fluid and can write information onto a disk with an inner edge, comprising:
    a motor;
    a post coupled to said motor;
    a plurality of cartridges attached to said post, each cartridge having a biasing element that can move within a variable orifice and engage the inner edge of the disk, each variable orifice being in fluid communication with the source of fluid through a fixed orifice;
    a head that can be coupled to the disk; and,
    a servo writing circuit that is coupled to said head.

20. The servo writer of claim 19, wherein said biasing element is a ball.

21. The servo writer of claim 19, wherein said cartridge includes an insert with an opening and said biasing element extends through said opening.

22. The servo writer of claim 21, wherein said insert includes a plurality of ports in fluid communication with said variable orifice.

23. A servo writer that is coupled to a source of fluid and can write information onto a disk with an inner edge, comprising:

a motor;

a post coupled to said motor;

a plurality of cartridges attached to said post and coupled to the source of fluid, each cartridge exerts an essentially equal force on the inner edge of the disk when the disk is centered onto said post, each cartridge contains a biasing element that moves independently of the biasing elements in the other cartridges;

a head that can be coupled to the disk; and, a servo writing circuit that is coupled to said head.

24. The servo writer of claim 23, wherein said biasing elements each move within a variable orifice and engage the inner edge of the disk, each variable orifice being coupled to the source of fluid through a fixed orifice.

25. The servo writer of claim 23, wherein said biasing element is a ball.

26. The servo writer of claim 24, wherein said cartridge includes an insert with an opening and said biasing element extends through said opening.

27. The servo writer of claim 26, wherein said insert includes a plurality of ports in fluid communication with said variable orifice.

28. A method for centering a disk using a force of fluid, the disk having an inner edge, comprising:

placing the disk onto a chuck that has a plurality of cartridges, wherein each cartridge contains a biasing element which exerts a force onto the inner edge of the disk; and, moving the disk to move biasing elements until fluidic forces exerted by the cartridges onto the inner edge of the disk are essentially equal, the biasing elements moving independently from each other.

29. The method of claim 28, wherein each biasing element moves within a variable orifice.

* * * * *